United States Patent
Kapuria et al.

(10) Patent No.: US 10,861,336 B2
(45) Date of Patent: Dec. 8, 2020

(54) MONITORING DRIVERS AND EXTERNAL ENVIRONMENT FOR VEHICLES

(71) Applicants: Anuj Kapuria, Haryana (IN); Ritukar Vijay, Haryana (IN)

(72) Inventors: Anuj Kapuria, Haryana (IN); Ritukar Vijay, Haryana (IN)

(73) Assignee: THE HI-TECH ROBOTIC SYSTEMZ LTD., Haryana (IN)

( * ) Notice: Subject to any disclaimer, the term of this patent is extended or adjusted under 35 U.S.C. 154(b) by 0 days.

(21) Appl. No.: 16/132,371

(22) Filed: Sep. 15, 2018

(65) Prior Publication Data

US 2019/0088130 A1 Mar. 21, 2019

(51) Int. Cl.
*G08G 1/16* (2006.01)
*G06K 9/00* (2006.01)
*B60W 50/16* (2020.01)
*B60W 50/14* (2020.01)

(52) U.S. Cl.
CPC ............... *G08G 1/16* (2013.01); *B60W 50/14* (2013.01); *B60W 50/16* (2013.01); *G06K 9/00805* (2013.01); *G06K 9/00845* (2013.01); *B60W 2050/143* (2013.01); *B60W 2050/146* (2013.01); *B60W 2420/42* (2013.01); *B60W 2420/52* (2013.01); *B60W 2520/06* (2013.01); *B60W 2540/043* (2020.02); *B60W 2540/22* (2013.01); *B60W 2540/26* (2013.01)

(58) Field of Classification Search
CPC ........................................................ G08G 1/16
USPC ........................................................ 340/435
See application file for complete search history.

(56) References Cited

U.S. PATENT DOCUMENTS

| 8,487,929 | B2 * | 7/2013 | Lyashevsky | ......... | H04N 19/139 |
| | | | | | 345/428 |
| 9,493,118 | B1 * | 11/2016 | Laur | ................. | B60W 30/0953 |
| 2014/0266655 | A1 * | 9/2014 | Palan | ..................... | G08G 1/052 |
| | | | | | 340/435 |
| 2015/0193885 | A1 * | 7/2015 | Akiva | .................. | G07C 5/0841 |
| | | | | | 705/4 |
| 2018/0046870 | A1 * | 2/2018 | Cordell | .................... | B60R 1/00 |
| 2018/0067495 | A1 * | 3/2018 | Oder | .................... | G05D 1/0255 |
| 2019/0041228 | A1 * | 2/2019 | Singhal | ................. | B60W 40/08 |

* cited by examiner

*Primary Examiner* — Qutbuddin Ghulamali
(74) *Attorney, Agent, or Firm* — Law Offices of Steven W. Weinrieb

(57) ABSTRACT

The present subject matter relates to varying warning intensity based on driving behaviour and driver state. Data related to external environment to a vehicle is fetched and the driver state and driving behavior is monitored. Based on the fetched data and monitored data, an event is determined, and warning is generated for a driver of the vehicle. The intensity of the warning is varied based on severity of the event and the driver state and the driving behavior.

15 Claims, 10 Drawing Sheets

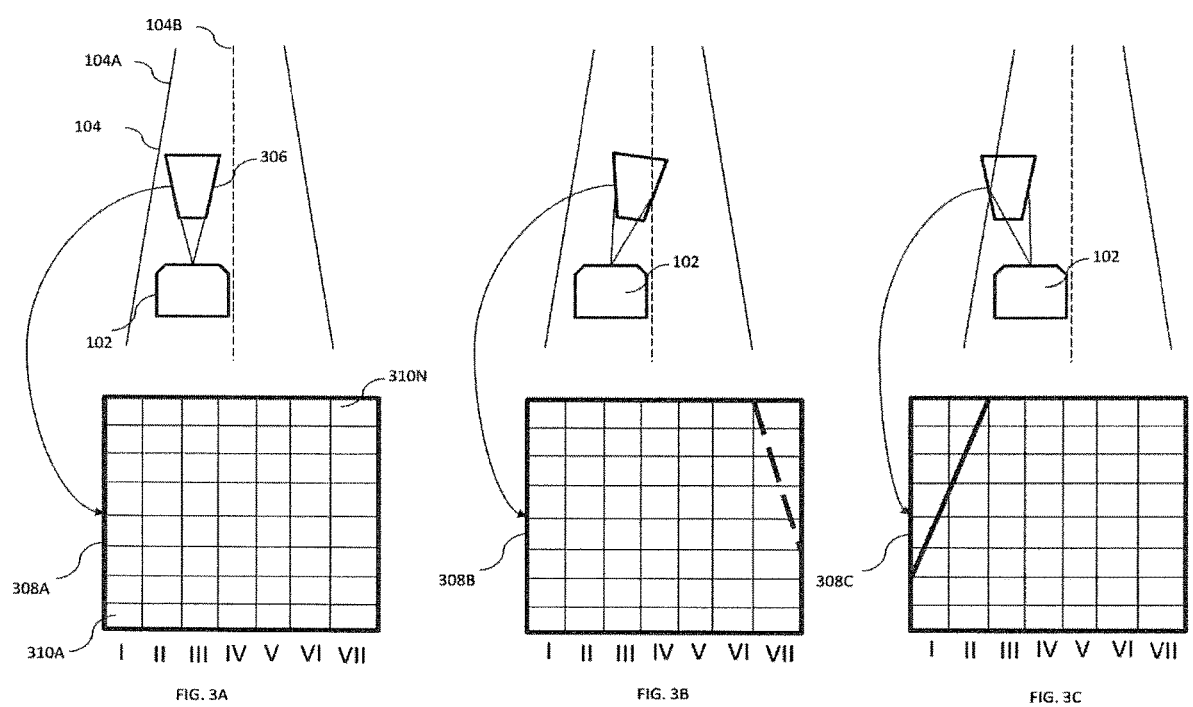

MONITORING DRIVERS AND EXTERNAL ENVIRONMENT FOR VEHICLES

TECHNICAL FIELD

The present subject matter relates generally to monitoring drivers and external environment for vehicles and particularly to monitoring driver state, a driving pattern of a driver in a vehicle, and the external environment.

BACKGROUND

Modern vehicles are generally equipped with various types of monitoring systems, such as cameras, or video recorders to monitor surrounding environment of vehicles and provide a driver of a vehicle with useful data regarding the surrounding environment for improved driving. Such monitoring systems may be installed, for instance, on a roof of the vehicle or on the front portion, back portion of the vehicle to have a broad view of the surrounding environment and capture data associated with objects, pedestrians or vehicles within the surrounding environment.

In addition, the monitoring systems may also monitor the driver of the vehicle for facial pose and gaze. For instance, the driver may be monitored for orientation of the face and the gaze to be in a forward direction and determine if the driver is paying attention on the road. The collected data is then subjected to processing to derive meaningful information that may be used in assisting the driver for navigation, changing lanes, and averting a potential collision. An event, such as an approaching vehicle, a pedestrian on the road may be detected and a warning may be issued to the driver to help the driver initiate a precautionary action.

However, such monitoring systems, on many occasions, fail to detect events with accuracy due to various factors such as incomplete data or incorrect data, and issue false or irrelevant warnings to the driver. These warnings are generally issued at high volumes to alert the driver that on many instances may startle or distract the driver, thereby inciting a sudden action that could be potentially harmful for the safety of the driver. Further, such irrelevant warnings issued regularly at high volumes may cause a general discomfort, and impact driving of the driver. Therefore, the monitoring systems are not efficient in detecting events and issuing warning to the drivers for enhancing driving experience and safety.

SUMMARY

This summary is provided to introduce concepts related to monitoring drivers and external environment for vehicles. This summary is not intended to identify essential features of the claimed subject matter nor is it intended for use in determining or limiting the scope of the claimed subject matter.

In an example implementation of the present subject matter, an ADAS includes a driver monitoring module, an exterior monitoring module, a processor coupled to the driver monitoring module and the exterior monitoring module, and a warning generating module coupled to the processor.

The driver monitoring module may be positioned facing a driver to monitor a driver state, such as drowsiness, sleepiness, and inattentiveness of the driver. The driver state may be monitored based on various factors, such as blinking of eyes, head movement, color of skin, frowning, eye ball movements. For instance, a closing of eyes more than 3 seconds may be classified as drowsiness, and a high degree of head movement may be classified as inattentiveness.

Simultaneously, the exterior monitoring module, facing the road, captures data regarding objects, lane markings, potholes, speed signs, and traffic conditions from external environment. The exterior monitoring module may also monitor driving pattern of the driver. For example, whether the driver is driving the vehicle in line with the lanes of the road or driving inconsistently and frequently crossing the lanes and the boundaries of the road.

In an example implementation of the present subject matter, the exterior monitoring module may adjust a Region of Interest (ROI) of the view of the road or external environment based on at least data associated with a path of travel of the vehicle, for instance a driver indication for a turn, a path travelled by the vehicle, and a Global Positioning System (GPS) signal. In one example, when the driver is planning to take an exit route and provides an indicator of taking the exit route on right then based on the indicator input, the exterior monitoring module may shift the ROI to right on the exit route and monitor pedestrians, objects, and other vehicles on the exit route.

The data captured from the driver monitoring module and the exterior monitoring module are sent to the processor. The processor processes the data to detect occurrence of an event, for instance, an approaching pedestrian or a vehicle, an object on the road. Upon detection of an event, the processor signals the warning generating module to generate a warning based on the detected event. For instance, a continuous beep sound or a voice based alert may be generated to alert the driver about the event.

In an example implementation, intensity of the warning may be varied based on the data received from the exterior monitoring module and the driver monitoring module. For instance, when the vehicle is approaching a pedestrian, who is at a distance of around 250 meters, and the driver is attentive, then volume of the beep sound may be low. However, when the vehicle is approaching the pedestrian with speed, the volume of the beep sound is increased until a preventive action is taken to avert a collision or until the pedestrian reaches a safe place that is outside the view of the exterior monitoring module.

It would be noted that the driver monitoring module, the exterior monitoring module, the processor, and the warning generating module may operate in real-time to capture and process the data to generate the warning. Further, the intensity of the warning is also varied in real-time based on criticality of the event.

Although, the present subject matter has been described with reference to an integrated ADAS comprising the modules, the present subject matter may also be applicable to monitoring driver and the external environment by the modules placed at different areas within an autonomous vehicle, wherein the modules are communicatively coupled to each other.

Thus, the present subject matter provides efficient techniques for detecting events and alerting a driver. The techniques provide adaptive warning to the driver of the vehicle, wherein intensity level of the warning is varied based on driver state data, driving pattern data and the external environment data. Further, the events detected are accurate and the warning generated are relevant to a specific situation to enable the driver respond aptly to the events thereby enhancing driver safety.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 3A-3D illustrate modes of operation of an ADAS for recognizing driving behavior, in accordance with an aspect of the present subject matter;

DETAILED DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
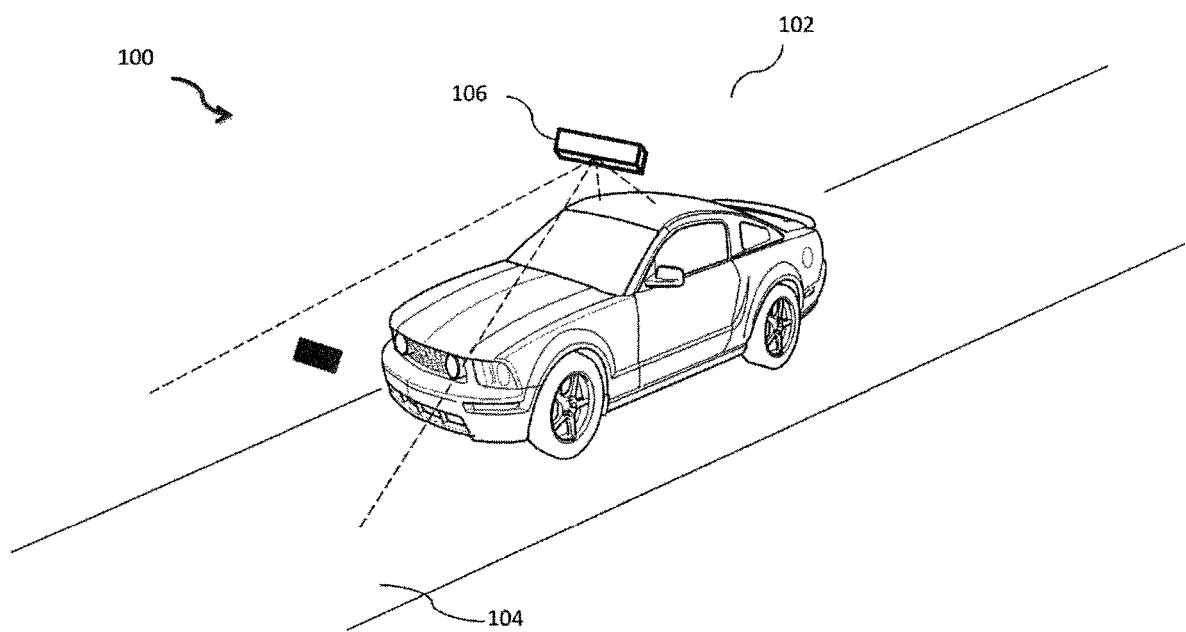
FIG. 1 illustrates an example environment having a vehicle configured with an ADAS in accordance with an aspect of the present subject matter.

Referring now to FIG. 1, an example environment 100 in which various embodiments may function is illustrated. As shown the environment 100 includes a vehicle 102 moving or being driven on a road 104. The vehicle 102 may be a car, a jeep, a truck, a bus, or a three-wheeler vehicle. The vehicle 102 may have parts like steering wheel, tires, brake, engine, carburetor, doors, horn, lights, etc. not shown in the figure. Also, the vehicle 102 may be provided with physical actuators connected to critical function parts like brakes, engine control unit, steering wheel, horn and lights.

The vehicle 102 further includes an Advanced Driver Assistance System (ADAS) 106 positioned such that the ADAS 106 may monitor facial expressions of the driver and may monitor the external environment. In one example, the ADAS 106 may be positioned close to the rear view mirror of the vehicle 102. It would be noted that, although the ADAS 106 is shown positioned near the rear view mirror, the ADAS 106 may be positioned at other places with in the vehicle 102. For instance, the ADAS 106 may be positioned on one of a windshield behind an internal rear view mirror, an "A" pillar of the vehicle 102, and on a dashboard.

The ADAS 106 may have various modules to collect external data, such as data associated with roads, pedestrians, objects, road edges, lane marking, potential collision, speed signs, potholes, vehicles, and a driving pattern of the driver on the road. Additionally, the ADAS may monitor driving pattern of the driver such as whether the driving is in line with the lanes and boundaries of a road. Further, the modules may also capture data related to driver state, such as facial expressions and features, blink rate of eyes, eyeball movement, opening of the eye, and head movement of the driver. The ADAS 106 may also warn the driver corresponding to events, such as a pedestrian crossing the road, or a cyclist in front of the vehicle.

It would be noted that ADAS 106, in one example, may have the modules placed at different positions within the vehicle. For instance, the module for monitoring the driver may be coupled to the windscreen and the module to generate the warning may be coupled to the A-pillar. Such components may either be connected through a wired connection or through a wireless communication to communicate and share data.

In one example, the ADAS 106 may be connected to an external server (not shown in figure) through a wireless network, such as a datacenter for cloud backup and data archiving purpose. For instance, information associated with occurrence of an event and preventive action taken by the driver may be recorded for a predefined time span of 1 minute, 30 seconds, or 5 seconds and relayed to the datacenter. Such information may be stored within the datacenter and may be used for analyzing driver pattern during the events and providing useful information to other drivers in similar situations. Also, the information may be utilized for validating insurance claims or insurance premium calculations.

In another example, the ADAS 106 may be connected to the actuators as mentioned above. This helps to take over control of these critical function parts in an event of user failing to react.

The details of the components or modules of the ADAS 106 and functionality of the modules have been further explained with reference to description of the forthcoming figures.

Figure 2:
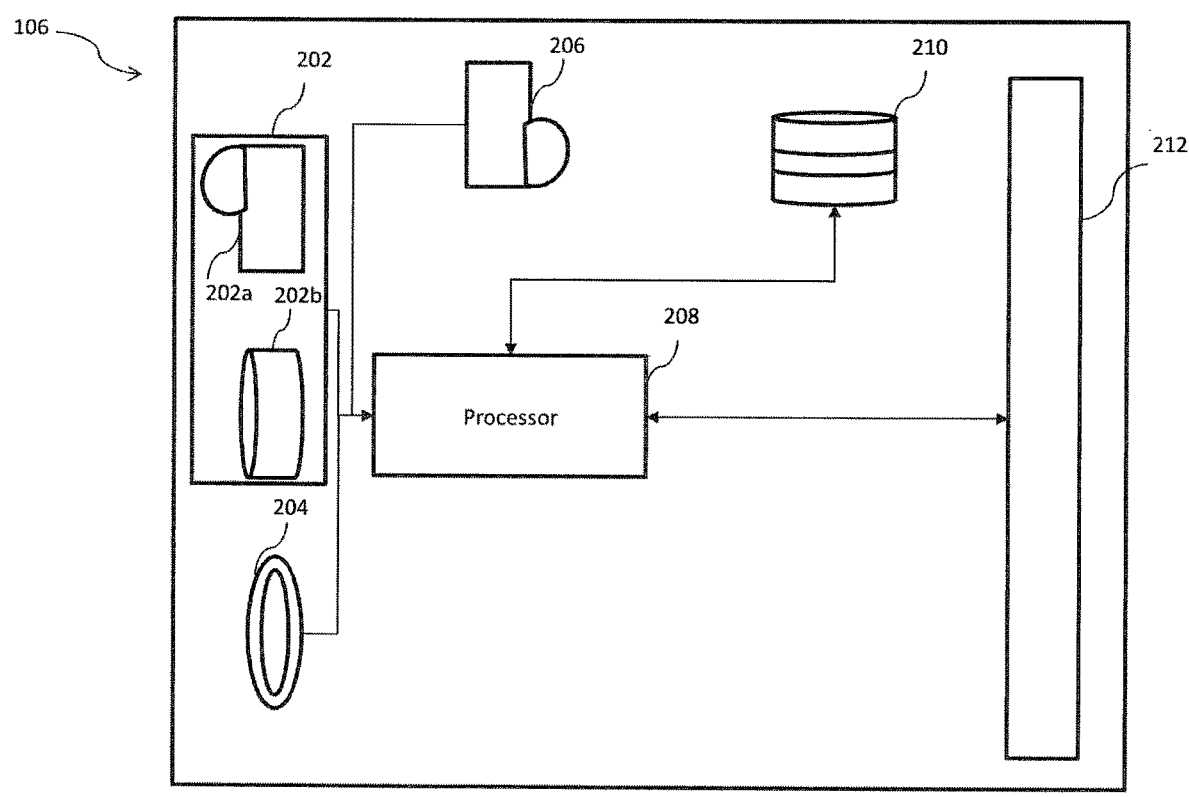
FIG. 2 illustrates various modules of an ADAS, in accordance with an aspect of the present subject matter.

FIG. 2 illustrates various modules of the ADAS 106, in accordance with an implementation of the present subject matter. The ADAS 106 includes an exterior monitoring module 202, a driver monitoring module 206, a ranging module 204, a processor 208, a memory 210 and a warning generation module 212. The processor 208 may be communicably connected to the exterior monitoring module 202, the driver monitoring module 206, and the ranging module 204. The processor 208 may also be communicably connected to a memory 210 and the warning generation module 212.

In an implementation, the modules, such as the exterior monitoring module 202, the driver monitoring module 206, the ranging module 204, and the driver monitoring module 206 may include routines, programs, objects, components, data structures, and the like, which perform particular tasks or implement particular abstract data types. The modules may further include modules that supplement applications on the ADAS 106, for example, modules of an operating system. Further, the modules can be implemented in hardware, instructions executed by a processing unit, or by a combination thereof.

In another aspect of the present subject matter, the modules may be machine-readable instructions which, when executed by a processor/processing unit, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The exterior monitoring module 202 is configured to be facing out of the vehicle 102. This configuration helps the exterior monitoring module 202 to capture data from environment external to the vehicle 102.

In an embodiment of the present subject matter, the exterior monitoring module 202 may include a stereo camera 202A and a long range narrow field camera 202A. The stereo camera 202A may be a dual lens camera having a short range. This helps the stereo camera 202A to capture data within a short distance of the vehicle 102. The stereo camera 202A captures the nearby objects, events and data. Further, the long range narrow field camera 202B is configured to capture events at a farther distance and hence captures objects, events and data at a longer distance from the vehicle 102. The stereo camera 202A and the long range narrow camera 202B may be configured to adjust autofocus with the changing environment. The capturing ranges of the stereo camera 202A and the long range narrow field camera 202B may overlap to capture maximum data from external environment. The exterior monitoring module 202 is configured to shift its region of interest. The shifting of the region of interest may be based upon a condition of path of travel of the vehicle 102. Details of shifting of region of interest will be described in detail in conjunction with FIGS. 4A-4C.

The driver monitoring module 206 is positioned to face the driver of the vehicle 102 and monitors driver state of the driver. The driver state is determined utilizing driver's eye gaze, facial expressions and head movement. Various driver states that may be determined by the driver monitoring camera are fatigue, sleepiness, anger, happy, jolly, sad, neutral, etc. Hence the driver monitoring module 206 is capable of determining multiple driver states. In another implementation of the present subject matter, the driver monitoring module 206 may be a charged coupled device camera, or a Complementary Metal Oxide Semiconductor (CMOS) camera.

In yet another embodiment of the present subject matter, the ranging module 204, used for determining distance to objects may be one of a light detection and ranging (LiDAR) unit, a radio detection and ranging (RADAR), a sonic detection and ranging (SODAR), and a sound navigation and ranging (SONAR).

In another embodiment of the present subject matter, the warning generation module 212 may include an audio, visual, or haptic warning interfaces. The warning generation module 212 may include a Light Emitting Diode (LED) display, a Liquid Crystal Display (LCD), a plasma display, a warning light emitter, a speaker, a haptic feedback module, or a combination thereof.

The processor 208, amongst other capabilities, may be configured to fetch and execute computer-readable instructions stored in a memory. The processor 208 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software.

The processor 208 and other modules like the exterior monitoring module 202, the driver monitoring module 206, the ranging module 204 and the warning generation module 212 as described above may be implemented as hardware or software. If such modules are implemented in software, one or more processors of the associated computing system that performs the operation of the module direct the operation of the computing system in response to having executed computer-executable instructions. For example, such computer-executable instructions may be embodied on one or more computer-readable media that form a computer program product. In another implementation, the processor 208 may also be connected to GPS, indicator of the vehicle 102 or pre-fed path of the route to be covered by the vehicle 102.

In yet another embodiment of the present subject matter, a memory 210 may be utilized to store the collected external environment and internal environment data collected. The memory 210 may be without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

In operation, the exterior monitoring module 202 may continuously record the surrounding environment of the vehicle 102 and provide the input to the processor 208. In one example instant, the surrounding environment may include a pedestrian crossing the road and about 200 meters away from the vehicle 102, two vehicles ahead of the vehicle 102 at distances 210 meters and 220 meters and a cyclist on a left lane at a distance of 225 meters from the vehicle 102. The objects in the surrounding environment, such as the pedestrian, the two vehicles, and the cyclist are continuously monitored by the exterior monitoring module 202 in real-time and sent to the processor 208.

Figure 3D:
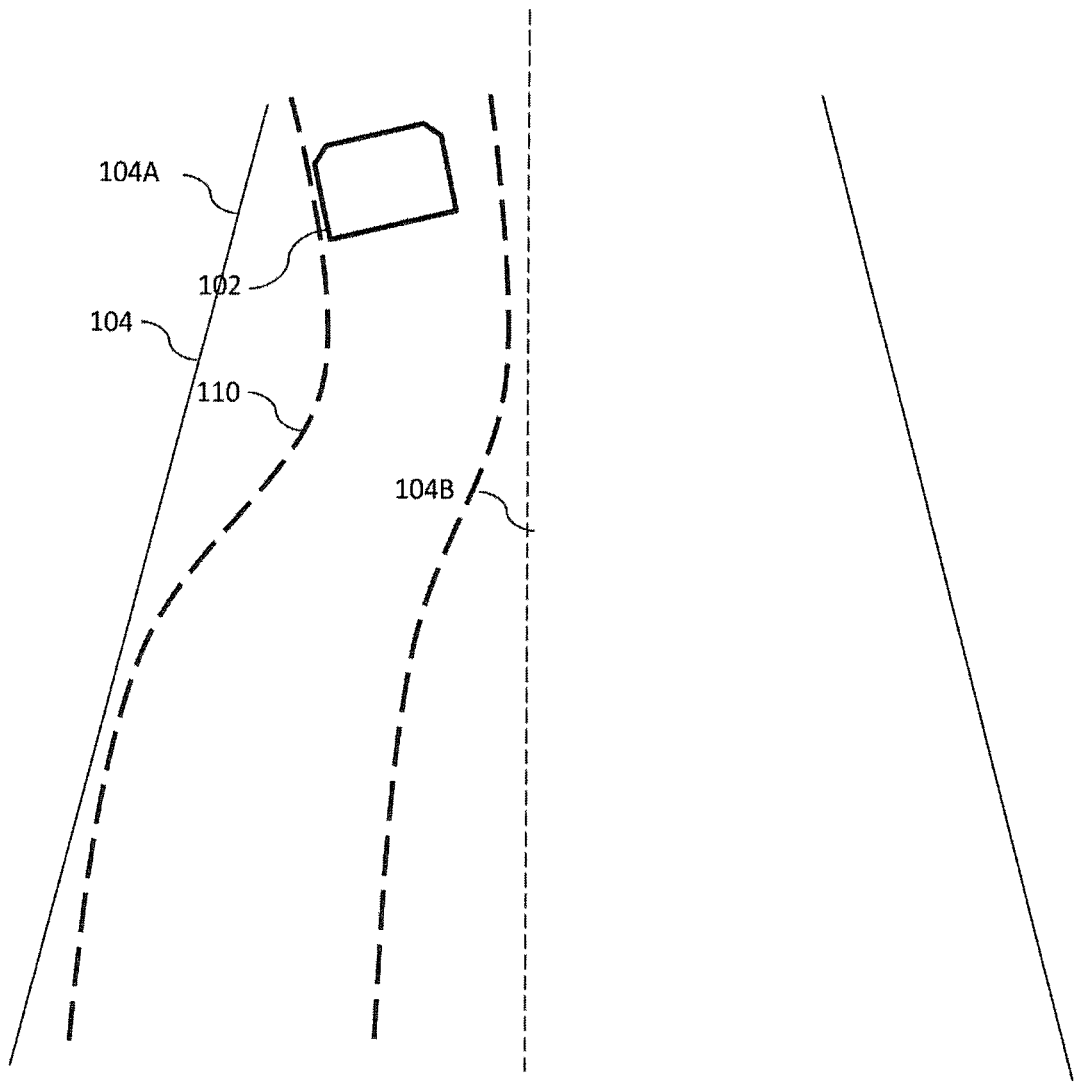

In another example, the exterior monitoring module 202 may detect the lanes or boundaries of a road or path travelled by the vehicle 102, as shown in FIGS. 3A, 3B and 3C. The FIG. 3A illustrates the road 104 travelled by the vehicle 102, and the Region of Interest (ROI) 306 as focused by the exterior monitoring module 202. In an example implementation, the exterior monitoring module 202 may move the ROI 306 to capture the boundary of the road 104 and a lane present on the road 104. In one example, the frames 308A, 308B, and 308C illustrate the ROI 306 as captured by the exterior monitoring module 202.

In another implementation, the shape of the ROI may be adjusted to adapt to the changing external environment data. For example, the shape of the ROI may be changed to fit to a particular portion of a curved road. Similarly, size change may be effected to cover cross roads conditions.

In one example, the ROI may be moved in a linear direction from left to right or from right to left. In another example, the ROI may be moved in a non-linear manner from one point to another point depending upon the external conditions. For example, the ROI may be moved from a first point on a straight road to a second point on an elevated road, where the second point is above the plane of the first point. Thereafter, the exterior monitoring module 202 may capture the driving pattern of the driver based on the area of the road 104 covered by the vehicle 102 during travel. For instance, the exterior monitoring module 202 may capture when the vehicle is driven along the lane or the boundary of the road 104, wherein the area covered by the vehicle 102 completely aligns with one of the lane and the boundary of the road 104. In a scenario, the vehicle may be driven in a zig-zag manner that does not align with the one of the road boundary and the lane and frequently crosses the lanes. In an example implementation, the vehicle 102 may be driven in a wave-manner as illustrated in the FIG. 3D.

It would be noted that the driving pattern is indicative of the manner in which the vehicle 102 is being driven on the road 104. For instance, when a driver is attentive then the driver is likely to drive in alignment with the lane or the boundary and when the driver is inattentive, drowsy, or under the influence of a drug, the driver may drive inconsistently and not in alignment with the lane or the boundary.

Similarly, driver state data is captured by the driver monitoring module 204. For example, the driver monitoring module 206 may continuously record facial expressions of the driver for eye gaze, blink rate of eyelids, change in skin tone, nostrils, jaw movements, frowning, baring teeth, movement of cheeks, movement of lips and head movements when the driver is driving the vehicle on the road 104. The continuous recording of the driver state is fed to the processor 208.

In an example, the processor 208 receives the data from the exterior monitoring module 202 and the driver monitoring module 204 and processes the received data. The processing of the data as received by the processor 208 is explained in conjunction with the description of FIG. 4.

Figure 4:
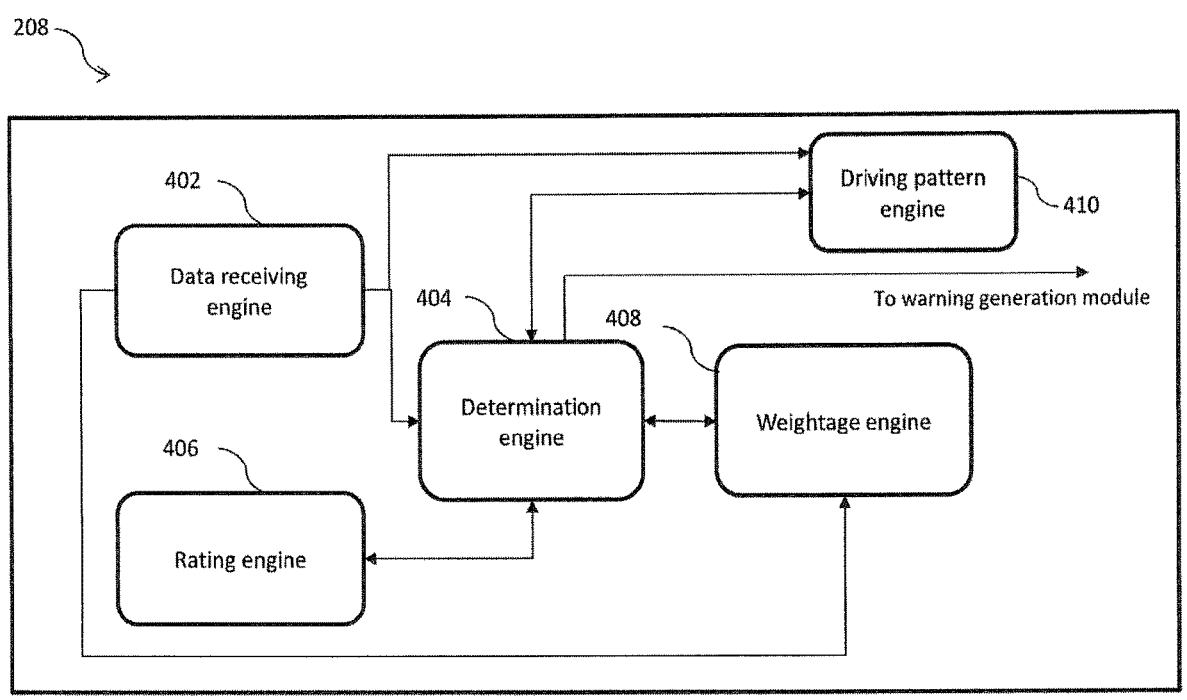
FIG. 4 illustrates a processor and its components, in accordance with an aspect of the present subject matter.

FIG. 4 illustrates various engines of the processor 208, in accordance with an implementation of the present subject matter. Engines may be microcontrollers functioning in tandem with each other to achieve coordinated output from the processor 208. The processor 208 includes a data receiving engine 402, a determination engine 404, a rating engine 406, a weightage engine 408, and a driving pattern engine 410. The determination engine 404 may be communicably connected to the data receiving engine 402, the rating engine 406, the weightage engine 408 and the driving pattern engine 410.

In an implementation, the engines such as the data receiving engine 402, the determination engine 404, the rating engine 406, the weightage engine 408 and the driving pattern engine 410 may include routines, programs, objects, components, data structure and the like, which perform particular tasks or implement particular abstract data types. The engines may further include engines that supplement applications on the processor 208, for example, modules of an operating system. Further, the engine can be implemented in hardware, instructions executed by a processing unit, or by a combination thereof.

In another aspect of the present subject matter, the engines may be machine-readable instructions which, when executed by a processor/processing unit, perform any of the described functionalities. The machine-readable instructions may be stored on an electronic memory device, hard disk, optical disk or other machine-readable storage medium or non-transitory medium. In an implementation, the machine-readable instructions can also be downloaded to the storage medium via a network connection.

The data receiving engine 402 is communicably connected to the determination engine 404, the driving pattern engine 410 and the weightage engine 408. The data receiving engine 402 forwards the data received simultaneously to the determination engine 404, the weightage engine 408 and the driving pattern engine 410 for simultaneous processing. The determination engine 404 may also be communicably connected to the rating engine 406.

In an example operation, the data receiving engine 402 may receive data associated with path of travel of the vehicle 102. For instance, the data regarding the changes may be generated by steering angle change more than a predetermined threshold, indicator switched on by the driver, path change like a curving road or crossroads or lane change as per GPS or on the basis of a pre-fed route in navigation system of the vehicle. The data receiving engine 402 may also be configured to receive data from a vehicle console or an Electronic Control Unit (ECU) of the vehicle 102. The ECU may communicate data regarding changes the driving path of the vehicle 102. The data may be then forwarded to the determination engine 404.

The determination engine 404 may analyze the change data and generate a signal to be sent to the external monitoring module 202 to change its focus position in order to change ROI. The signal generated may be received by the external monitoring module 202 through an interface (not shown in figure). The interface may be configured to interpret the information within the signal and change the orientation of the external monitoring module 202 in order to change the ROI as per the change data. For orientation change of the external monitoring module 202, the ADAS 106 may include low power DC motors (not shown in figure) to help in movement of the external monitoring module 202. In another example, the ROI may be shifted without a change in the orientation of the exterior monitoring module 102. The exterior monitoring module 102 may change the focal length or zone to adjust the ROI.

Figure 5A:
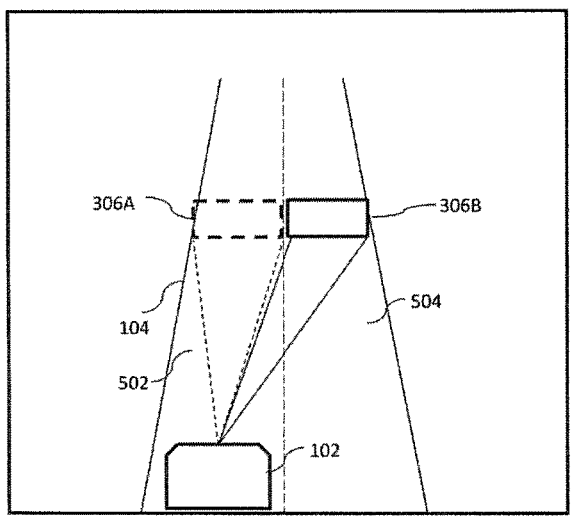
FIG. 5A-5C illustrate example operations of an exterior monitoring module of an ADAS for shifting Region of Interest (ROI), in accordance with an aspect of the present subject matter.
Figure 5B:
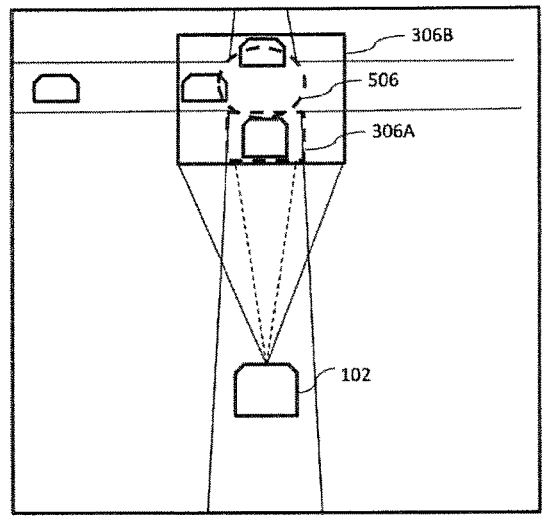
Figure 5C:
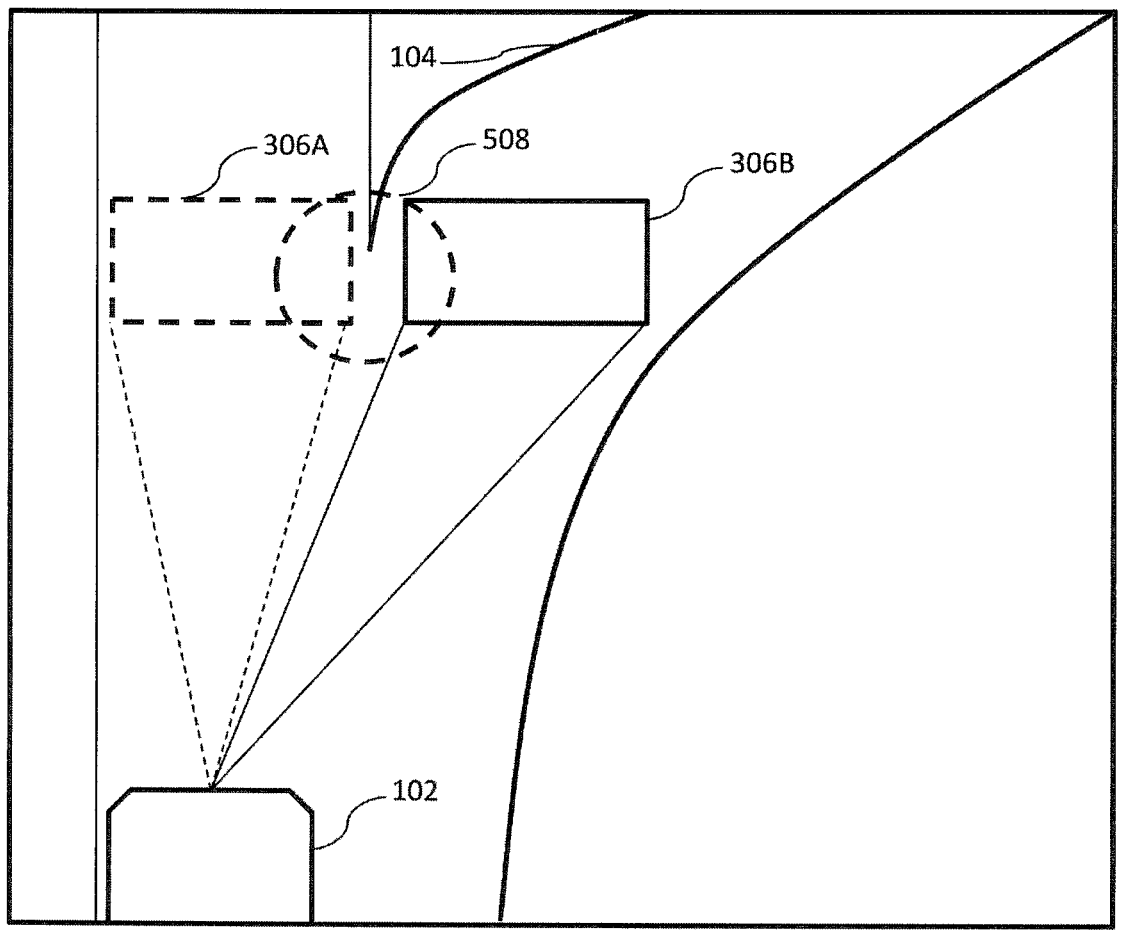

FIGS. 5A-5C, illustrate shifting of the ROI, in accordance to an embodiment of the present subject matter. FIG. 5A depicts shifting of region of interest 306A (similar to region of interest 306) based on the indicator initiation by the driver of the vehicle 102. As shown, if the driver of the vehicle 102 faces a situation wherein the driver has to shift to its existing lane 502 to one on the left 504, the driver may turn on the indicator. Upon the turning on of the indicator, the data receiving engine 402 may receive this information from the vehicle console or the ECU and direct the exterior monitoring module 102 to shift or adjust the ROI 306A. The ROI 306A may then be shifted a new ROI 306B. After shifting the ROI, the exterior monitoring module 102 may monitor the external environment data for the new ROI 306B. In other implementations, the region of interest 306A may also be shifted based on the steering wheel angle change. If the steering wheel angle is changed beyond a threshold value, the region of interest 306A is shifted to new region of interest 306B.

In another scenario, as depicted in FIG. 5B, in case of an approaching cross road 506, the region of interest 306A is adjusted in a perspective manner. The ROI 306A is expanded to new region of interest 306B to cover more area of the road so as to monitor traffic on other roads and detect if other vehicles approach the vehicle 102 for a potential collision.

Similarly, region of interest 306A may also be shifted based on pre-fed route input, as illustrated by FIG. 5C. The driver may input a route into the vehicle 102 navigation console. Based on the navigation route, in case the vehicle 102 needs to take a right lane from a bifurcation 508 on road 104, as shown in the FIG. 5C, then the region of interest 306A is gradually shifted to a new region of interest 306B. The region of interest 306A may be gradually shifted and not suddenly as may be the case, with indicator initiation or steering wheel angle change. Thereafter, the external environment data is provided to the processor 208.

In an example, the data receiving engine 402 of the processor 208, receives the external environment data, and the driving pattern data from the exterior monitoring module 202 and the driver state data from the driver monitoring module 206. The combined data collected by the data receiving engine 402 may be saved in the memory 210 connected to the processor 208. Further, this data may also be sent to the determination engine 404, the weightage engine 408 and the driving pattern engine 410 for simultaneous processing.

For determining the driving pattern by the processor 208, the determination engine 404 may utilize various techniques. In one example, pixel mapping as shown in FIGS. 3A-3D, may be utilized for calculating the driving pattern. The determination engine 404 determines extremes of the road 104A and 104B. From the image captured, a pixel map 308A may be generated, that may be made up of multiple pixels 310A-310A.

Each pixel image may have multiple pixel rows for e.g. I, II, III, IV, V, VI, VII within which pixels 310A-310N lines. It should be appreciated by a person having ordinary skill in the art that there may be more pixel rows and the number of rows may be manipulated based on the requirement and the equipment scope. Pixel maps for the subsequent time frames captured may be generated, like 308B and 308C, as shown in FIGS. 3B and 3C respectively. The pixel maps 308A, 308B and 308C are then compared to each other in ascending order of time and the frequency of variation. The values of frequency variation $F_v$ may be compared to a threshold value $F_t$.

If $F_v > F_t$, then driving pattern may be classified as "Rash";

If $F_v < F_t$, then driving pattern may be classified as "Cautious";

If $F_v = F_t$, then driving pattern may be classified as "Not attentive".

There may be a variation captured as shown in pixel row VII and I, II, and III in pixel maps 308B and 308C as the vehicle 102 moves from its position on road during its motion. Hence the variation may be calculated for subsequent frames too and the frequency variation may be then calculated. For example, in FIG. 3D, the driving pattern may be determined as "Rash" as the path traversed 110 has high variation frequency.

The data receiving engine 402 may also forward the data to the driving pattern engine 410. The driving pattern engine 410 determines driving pattern of the driver by using the data captured by the exterior monitoring module 202. Details of driving pattern determination have been explained earlier in conjunction with FIGS. 3A-3D. In one example, the driving pattern engine 410 determines the criticality of the event in terms of likelihood or probability of having a damage caused to the vehicle 102 or the driver such as a potential collision with a pedestrian, an object on the road, another vehicle. The criticality may be determined based on various parameters, such as closeness of an object to the vehicle, speed of the vehicle, multiple objects present in front of the vehicle, the surrounding terrain. The driving pattern of the driver, after determination, may be forwarded to the determination engine 404 in order to be added to the event data already determined.

Thereafter, the determination engine 404, analyzes external environment data for any events like object identification, lane markings, speed limit signs, etc. In an example, the determination engine 404 may utilize known techniques of object detection and image processing to detect the events. Further, simultaneously the determination engine 404 determines the driver state using the driver data. The determination engine 404, may use a pixel mapping technique to identify the facial expression and related driver emotions.

The determination engine 404 may utilize pre-stored templates to which pixel maps of the driver data may be utilized to determine driver state. The pre-stored templates may be stored within the memory 210 that may be fetched in real-time.

In one aspect, there could be a conflicting condition wherein one set of data may contradict with another set of data. For instance, it may be determined by the determination engine 404 that the driver is drowsy based on the driver state data received by the processor 208, and the driver is driving cautiously from the driving pattern data. In another example, when the driver appears to be attentive and looking towards the road however, the driving pattern is not proper and is zig-zag.

In such a scenario, the weightage engine 408 may receive the data from the data receiving engine 402. In situations of conflict in between the data from the driver monitoring module 206 and the exterior monitoring module 202, the weightage engine 408 determines which data should be given more weightage. In an implementation, the external environment data is given more priority. For example, when the driver is appearing to be drowsy but the driving of the driver is perfectly fine, then the weightage engine 408 provides more value to the driving pattern data for generating the warning. Similarly, when the driver is determined to be attentive based on the driver state data, and the driving is determined to be inattentive based on the driving pattern data, then the driving pattern is given more weight and the warning issued is generally at high intensity.

Based on the events determined from the external environment data, the driver state data, and the driving pattern, the determination engine 404 may determine to issue a warning to the driver. Thereafter, the intensity of the warning may be ascertained by the rating engine 406. The rating engine 406 receives the criticality of the event, the driver state data, and the driving pattern. The table below shows an example relation utilized by the relation engine 406 to determine the intensity of the warning by utilizing the parameter of closeness of the object to the vehicle 102. It is to be noted that the below example is not to be considered limiting to the scope of the present subject matter and is provided for illustrative purposes.

TABLE I

| Criticality of the Event | Driver State | Driving pattern | Intensity |
| --- | --- | --- | --- |
| Pedestrian very close (<20 meters) | Driver Drowsy | Rash | Extremely High |
| | Driver attentive | Rash | Very High |
| | Driver attentive | Cautious | High |

TABLE I-continued

| Criticality of the Event | Driver State | Driving pattern | Intensity |
|---|---|---|---|
| Pedestrian close (20-70 meters) | Driver attentive | Not attentive | Medium |
| | Driver inattentive | Rash | High |
| | Driver attentive | Cautious | Low |
| Pedestrian far (70-120 meters) | Driver inattentive | Rash | Medium |
| | Driver attentive | Not attentive | Very Low |
| | Driver attentive | Cautious | Extremely Low/No warning |

For example, if the pedestrian is determined to be close, for instance less than 20 meters, the driver state is drowsy, and the driving pattern is rash, then the intensity of the warning issued may be extremely high. In such a scenario, the volume of the beep sound may be very high and may be issued along with a glaring light. In another scenario, when the pedestrian is at a distance of about 100 meters from the vehicle 102, the driver is attentive and is cautiously driving the vehicle 102, then the intensity of the warning is very low. In another scenario, there would be no warning issued, when the driver is cautiously driving and the pedestrian is at a distance of about 100 meters.

It would be noted that the warning to be issued is determined based on multitude of factors, for instance, driver state, criticality of the event, and driving pattern. Therefore, the event detection is accurate and relevant for a specific situation. Further, on many occasions, it becomes difficult to capture any one set of data, for instance, driver state data when the driver is wearing a cap or sunglasses that may hide a portion of the face and the eyes of the driver, or the driving pattern during foggy climate or heavy rain when outside visibility is low. In such situations, the determination engine 404 may utilize the remaining parameters captured to detect the event and issue a warning with a suitable intensity thereby enhancing robustness and reliability of such systems. There may be other rating methods applicable or parameters for ratings may be changed as per the requirements of a user.

Based on the intensity determined by the rating engine 406, the warning generating module 212 may issue the warning to the driver.

There may also be provided a switch button on the ADAS 106 that may help the driver to acknowledge the warning. In another implementation, the processor 208 of the ADAS 106 may also be configured to determine whether there is any action taken by the driver in response to the generated warning. In an embodiment, the action may include, checking drive line change of the vehicle 102. Drive lane change of the vehicle 102 may be a straight-line path change calculated simultaneously when the vehicle 102 is being driven. If the straight-line path change is so much so that the situation is averted, then the warning may be stopped. Also, in another embodiment, the action may also be to notice any change is steering wheel angle of the vehicle 102 by the driver. In a scenario, after the steering angle is changed after the warning is generated to avert the event such as collision with a vehicle or a pedestrian, then the warning may be stopped.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "generating," or "monitoring," or "displaying," or "tracking," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 6:
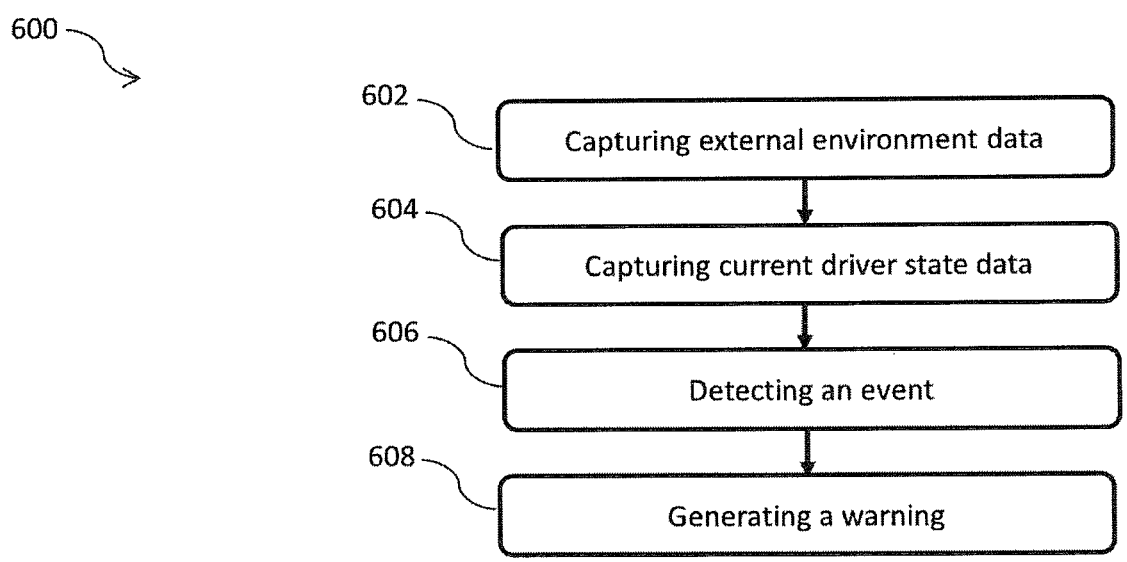
FIG. 6 illustrates a method for providing assistance to a driver of a vehicle, in accordance with an aspect of the present subject matter.

Now referring to FIG. 6, illustrates a method 600 for providing assistance to the driver of the vehicle 102, in accordance to an embodiment of the present subject matter. The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

At step 602, external environment data and driving pattern data are captured. In an example the exterior monitoring module 202 may capture the external environment data and the driving pattern data. In an implementation of the present subject matter, stereo camera 202A and the long-range narrow filed camera 202B have different capturing ranges in order to capture maximum possible area ahead of the vehicle 102. At step 604, the driver state data is captured. In one example, the driver monitoring module 206 of the ADAS 106 captures the driver state data.

Thereafter, at step 606, an event is detected based on the external environment data, the driver state data, and the driving pattern data. In an example implementation, the processor 208, may detect the event. The external environment data is processed and analyzed to identify any event that may pose a threat from the exterior of the vehicle 102. The processor 208, may identify the external environment for stationary and mobile objects, the road edges, lane markings, vehicles in front, pedestrians, street lights, speed signs, or crossroads etc.

The processor 208 may utilize pixel mapping techniques wherein various images are taken at subsequent time frames detect the event. Pixel maps are generated for these images and compared in real-time to capture any variation or aberrations. For example, for a vehicle moving in-front, various images or video may be taken by the exterior monitoring module 202. Images may be taken at subsequent time intervals, whereas video may be taken continuously. However, if the pixel map determines size increasing in subsequent time frame images or video frames, then the vehicle in-front may be slowing down and is an event that the driver, should attend to. Similarly, the processor 208 may use a pixel mapping technique to identify the facial expression and related driver emotions. Also, the determination engine 404 may utilize pre-stored templates to which pixel maps of the driver data may be utilized to determine driver state. Event determined may be based on either the external event, or driver state or a combination of both.

At step 608, after determination of the event, a warning may be generated. IN one example, the warning generation module 212 may generate the warning. The warning generation module 212 may include an audio interface. Therefore, the warning generated may be an audio alarm. This warning may be varied based on the rating values ascertained for the events and the data accompanying the event. Also, the warning may be varied based on driving pattern determined from the external environment data.

The above described method enables varying of intensity of warning based on the event determined. The event determination is based on the external environment data and the driver state data. The variation of warning is based on the severity of the event based on the data.

Figure 7:
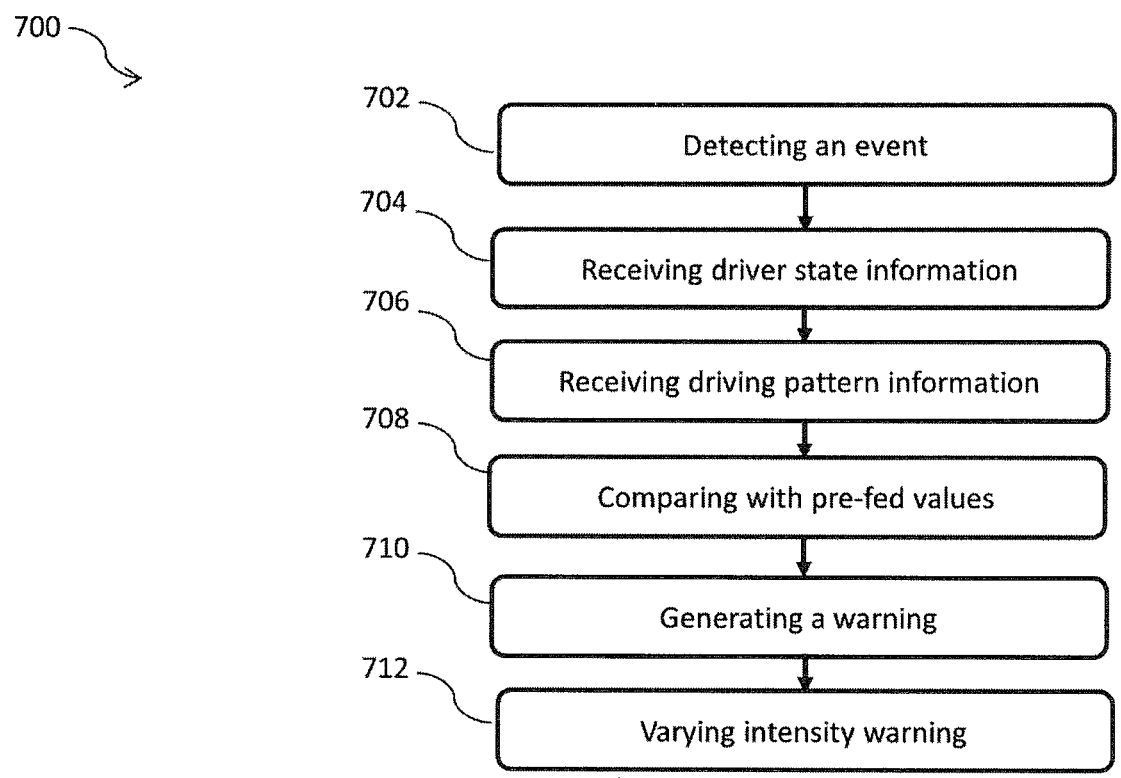
FIG. 7 illustrates a method for varying an intensity of warning based on an event, in accordance with an aspect of the present subject matter.

Now referring to FIG. 7, a method 700 for providing assistance to the driver of the vehicle 102, in accordance to an embodiment of the present subject matter.

At step 702, an event is detected. The event may be for instance, closeness of an object to the vehicle, number of objects on the road, terrain, speed of the vehicle 102. In one example, the processor 208 may detect the event based on the external environment data received from the exterior monitoring module 202. Thereafter, at step 704, driver state data is received. The driver state data may be received from the driver monitoring module 206. After receiving the driver state data, driving pattern data may be received at step 706.

In an example implementation, the processor 208 may receive the driving pattern data from the exterior monitoring module 202.

Thereafter, at step 708, the received driver state information and the driving pattern information is compared. The comparison may be made with an existing table of values containing pre-fed values. In one example, the intensity of the warning may be determined from a table (Table-I described earlier) that stores various combinations of the driver state data, the driving pattern data and the criticality of the event data and a corresponding intensity of warning for each combination. Based on the pre-fed values, the intensity of the warning is determined. At step 710, a warning of the intensity level determined at previous step us generated. Further, the warning generation module 212, then generates the warning of the desired intensity. At step 712, the intensity of the warning may be varied. The warning may be varied based on the rating values ascertained for the events and the data accompanying the event. Also, the warning may be varied based on driving pattern determined from the external environment data.

In another embodiment of the invention, the vehicle may take an auto corrective action in case there is no response or acknowledgement from the driver of the vehicle. The auto corrective action may be based on a distance threshold that is if for a particular distance from the event, the driver takes no corrective action, the ADAS 106 may take an action automatically. The auto corrective action may be a braking action, lane change, sounding horn, etc. For instance, if the vehicle is approaching a pedestrian and the driver of the vehicle has not performed any action when the vehicle is 5 meters away from the pedestrian, then a braking action to stop the vehicle may be performed. To perform the braking action, the processor may send signals to the actuators coupled to the brakes and upon receiving the signal, the actuators may aid in braking.

Figure 8:
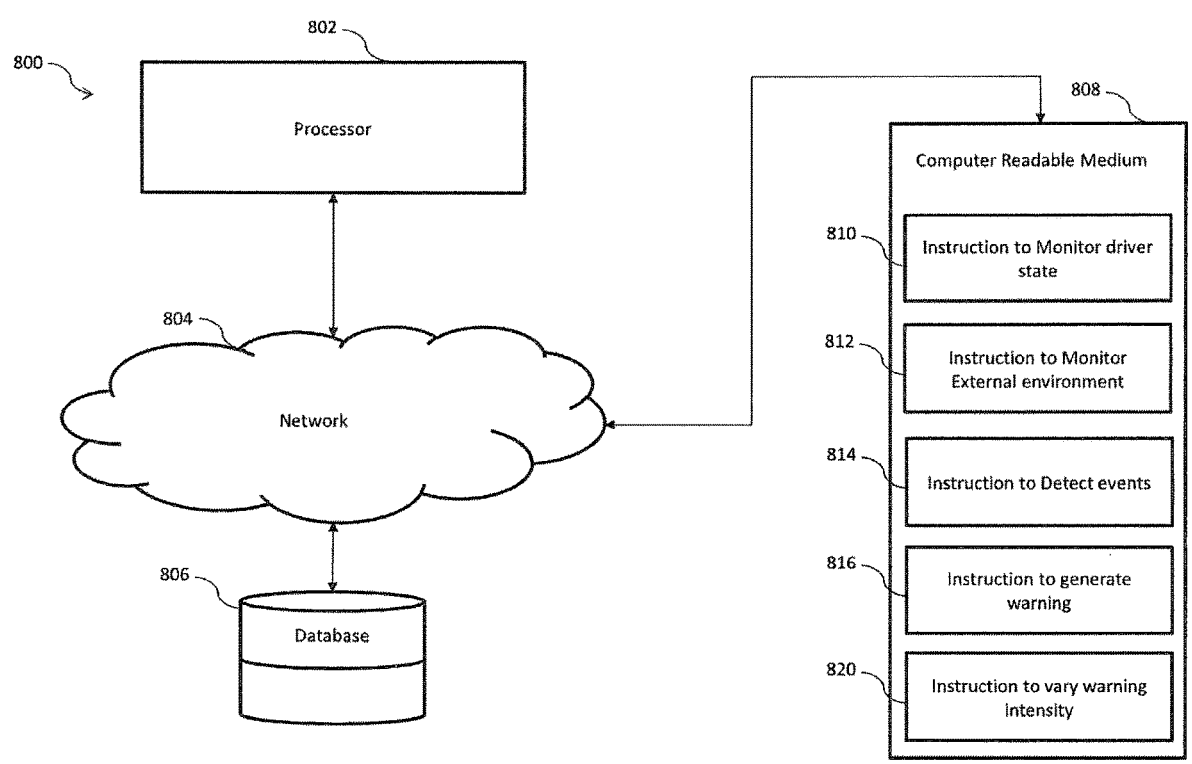
FIG. 8 illustrates an exemplary computer system, in accordance with an aspect of the embodiments.

Referring now to FIG. 8 illustrates an exemplary computer system 800 for implementing various embodiments is disclosed. The computer system 800 may comprise a central processing unit ("CPU" or "processor") 802. The processing unit 802 may comprise at least one data processor for executing program components for executing user- or system-generated requests. The processing unit 802 may include specialized processing units such as integrated system (bus) controllers, memory management control units, floating point units, graphics processing units, digital signal processing units, etc. The processing unit 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

In some embodiments, the processing unit 802 may be disposed in communication with a communication network 804 via a network interface (not shown in figure). The network interface may communicate with the communication network 804. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 804 may include, without limitation, a direct interconnection, local area network (LAN), wide area network (WAN), wireless network (e.g., using Wireless Application Protocol) etc.

In some embodiments, the processing unit 802 may be disposed in communication with one or more databases 806

(e.g., a RAM, a ROM, etc.) via the network 804. The network 804 may connect to the database 806 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. The database may include database from the exterior monitoring module 202, the ranging module 204 and the driver monitoring module 206.

The processing unit 802 may also be disposed in communication with a computer readable medium 808 (e.g. a compact disk, a USB drive, etc.) via the network 804. The network 804 may connect the computer readable medium 808 including without limitation, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium. The computer readable medium 808 may be processed by the computer system 800 or in any other computer system. The computer readable medium 808 may include instructions like instruction to monitor driver state, instruction to monitor external environment, instruction to detect events, instruction to generate warnings, or instructions to vary warning intensity.

It will be appreciated that, for clarity purposes, the above description has described embodiments of the present subject matter with reference to different functional units and processors. However, it will be apparent that any suitable distribution of functionality between different functional units, processors or domains may be used without detracting from the present subject matter.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

Alternatively, the method may be implemented using a combination of a processing unit 802, a non-transitory Computer Readable Medium (CRM) 808, Database 806 all connected to a network 804. The computer readable medium may include instructions that may be fetched by the processing unit 802. The instructions may include instruction to monitor driver state 810, instruction to monitor external environment 812, instruction to detect events 814, instruction to generate warning 816, and instruction to vary warning intensity 818.

In one example, the processing unit 802 may execute the instruction to monitor driver state 810 to initiate monitoring of the driver state by an exterior monitoring module 202. The exterior monitoring module 202 may monitor the driver's facial expressions, reactions, and features to determine if the driver is drowsy, or inattentive, as described earlier. Further, the processing unit 802 may also execute the instruction to monitor the external environment 812 to operate an exterior monitoring module, such as the exterior monitoring module 202 as described earlier to record the surrounding of the vehicle and provide the external environment data to the processing unit 802 for processing.

In an example implementation, the processing unit 802 may execute the instruction to detect events 814 to process the inputs received from the exterior monitoring module 202, and the driver monitoring module 202 and detect whether an event has occurred. The event may be an approaching vehicle, a pedestrian on a road, or a cyclist close to the vehicle. After detecting the event, the processing unit 802 may execute the instruction to generate warning 816 to issue a warning to the driver of the vehicle. In one example, the warning may be issued by a warning generating module, such as the warning generating module 202 of the vehicle 102 as described earlier.

Thereafter, the processing unit 802 executes the instruction to vary warning intensity 818 to adjust intensity of warning issued to the driver. In one example, the intensity of the warning may be varied based on various factors such as criticality of the event for instance when the vehicle is very close to the pedestrian, or when the vehicle is close to another vehicle and about to collide. During such critical events, the intensity of the warning is increased. In an aspect of the present subject matter, the warning issued may be a voice based alert.

Further, the CRM 808 may include an instruction to prioritize data. In a scenario, the processing unit 802 may process the instruction to prioritize data to prioritize data from one of the exterior monitoring module 202 and the driver monitoring module 206 in a case when there is a mismatch between the data of the modules.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

Therefore, the present subject matter provides an efficient mechanism of detecting an event and issuing relevant warning to the user with accuracy, wherein the intensity is varied as per the situation. Variation of the intensity helps in providing apt level of warning to the driver of the vehicle that enables the driver to take apt decision about handling the situation and improves driver experience. Further, the present subject matter detects event in situations when one data set may not be available thereby increasing robustness and reliability of the system and enhancing overall driver safety.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An Advanced Driver Assistance System (ADAS) for a vehicle comprising:
   a driver monitoring module to monitor a driver state of a driver in the vehicle;
   an exterior monitoring module to monitor at least one of an external environment of the vehicle and a driving pattern of the driver, and shift a region of interest of view of the external environment, wherein the region of interest is shifted based on changes in data associated with path of travel of the vehicle, wherein a shape of the region of interest is adjusted to adapt the changes in external environment data received from the exterior monitoring module and a size of the region of interest is changed to cover cross roads conditions;
   a processor, coupled to the driver monitoring module and the exterior monitoring module, to:
      receive driver state data from the driver monitoring module and external environment data from the exterior monitoring module; and
      detect an event based on at least one of the external environment data and the driver state data; and
   a warning generating module, coupled to the processor, to generate a warning for the driver in response to the event, wherein the intensity of the warning is based on at least one of the external environment data and the driver state data.

2. The ADAS of claim 1 further comprising a ranging module to determine a distance between an object in the external environment and the vehicle.

3. The ADAS of claim 2, wherein the ranging module is one of a light detection and ranging (LiDAR) unit, a radio detection and ranging (RADAR), a sonic detection and ranging (SODAR), and a sound navigation and ranging (SONAR).

4. The ADAS of claim 1, wherein the exterior monitoring module is one of a stereo camera and a long range narrow field camera.

5. The ADAS of claim 1, further includes a weightage module to prioritize an input from the driver monitoring module and the at least one exterior monitoring module during a mismatch between inputs from the driver monitoring module and exterior monitoring module.

6. The ADAS of claim 1, wherein the processor detects the event by:
   capturing external environment in data frames captured at subsequent time intervals, wherein the time intervals are in ascending order,
   generating pixel map of each of the data frames captured, and comparing pixel map of a data frame captured in a time interval falling earlier in ascending order with the pixel map of a data frame captured in a subsequent time frame in the ascending order.

7. The ADAS of claim 1, wherein the at least one driver monitoring module is a charge coupled device (CCD) camera.

8. The ADAS of claim 7, wherein the CCD camera monitors driver state based on eye gaze, blink rate of eyelids, change in skin tone, nostrils, jaw movements, frowning, baring teeth, movement of cheeks, movement of lips and head movements.

9. The ADAS of claim 1, wherein the data associated with path of travel is at least one of an indicator initiation, a steering wheel angle change, a pre-fed route, a Global Positioning System input.

10. The ADAS of claim 1, wherein each set of the driver state and the external environment are correlated with a rating, wherein each rating has a corresponding intensity of warning.

11. A method for providing assistance to a driver of a vehicle, the method comprising:
    capturing external environment data associated with an external environment of the vehicle;
    capturing driver state data associated with the driver;
    shifting a region of interest of a view of the external environment based on change in data associated with path of travel of the vehicle, wherein a shape of the region of interest is adjusted to adapt the changes in external environment data received from the exterior monitoring module and a size of the region of interest is changed to cover cross roads conditions;
    processing the external environment data and the driver state data to detect an event; and
    generating a warning for the driver in response to the event, wherein the intensity of the warning is based on at least one of the external environment data and the driver state data.

12. The method of claim 11 wherein the data associated with path of travel is at least one of an indicator initiation, a steering wheel angle change, a pre-fed route, and a Global Positioning System input.

13. A non-transitory Computer Readable Medium (CRM) for providing assistance to a driver of a vehicle, the non-transitory CRM comprising instructions executable by a processor to:
    capture external environment data associated with an external environment of the vehicle;
    capture driving pattern of the driver;
    capture driver state data associated with the driver;
    shift a region of interest of a view of the external environment based on change in data associated with path of travel of the vehicle, wherein a shape of the region of interest is adjusted to adapt the changes in external environment data received from the exterior monitoring module and a size of the region of interest is changed to cover cross roads conditions;
    process the external environment data, the driving pattern and the driver state data to detect an event; and
    generate a warning for the driver in response to the event, wherein the intensity of the warning is based on at least one of the external environment data and the driver state data.

14. The non-transitory CRM of claim 13, wherein the data associated with path of travel is at least one of an indicator initiation, a steering wheel angle change, a pre-fed route, and a Global Positioning System input.

15. The non-transitory CRM of claim 13, wherein the CRM further comprises an instruction to prioritize data from the at least one driver monitoring module and the at least one exterior monitoring module.

* * * * *